(12) United States Patent
Oya et al.

(10) Patent No.: US 10,375,433 B2
(45) Date of Patent: Aug. 6, 2019

(54) AUDIOVISUAL ACCESS CRITERION UPDATING METHOD, UPDATING CODE GENERATING SYSTEM, UPDATING CODE GENERATING DEVICE, AUDIOVISUAL ACCESS CRITERION MANAGING DEVICE, CONTENT RECEIVING SYSTEM, AND CONTENT DISTRIBUTION SYSTEM

(71) Applicant: Smart Mobile Broadcasting Technology, Inc., Taipei (TW)

(72) Inventors: Tomoyuki Oya, Taipei (TW); Toshimi Morizumi, Taipei (TW); Yuri Seki, Taipei (TW)

(73) Assignee: SMART MOBILE BROADCASTING TECHNOLOGY, INC., Taipei (TW)

( * ) Notice: Subject to any disclaimer, the term of this patent is extended or adjusted under 35 U.S.C. 154(b) by 43 days.

(21) Appl. No.: 15/669,124

(22) Filed: Aug. 4, 2017

(65) Prior Publication Data

US 2018/0063566 A1 Mar. 1, 2018

(30) Foreign Application Priority Data

Aug. 26, 2016 (TW) .............................. 105127411 A

(51) Int. Cl.
*H04N 7/16* (2011.01)
*H04N 21/266* (2011.01)
(Continued)

(52) U.S. Cl.
CPC ......... *H04N 21/266* (2013.01); *H04N 21/237* (2013.01); *H04N 21/2541* (2013.01);
(Continued)

(58) Field of Classification Search
CPC ........... H04N 21/26613; H04N 21/278; H04N 21/4753
See application file for complete search history.

(56) References Cited

U.S. PATENT DOCUMENTS 5,652,838 A * 7/1997 Lovett ..................... G06F 21/80
360/135
2004/0215909 A1* 10/2004 Imai ..................... G06F 12/1416
711/163
(Continued)

FOREIGN PATENT DOCUMENTS

JP H09-139930 A 5/1997
JP 2000-041231 A 2/2000
(Continued)

*Primary Examiner* — Gigi L Dubasky
(74) *Attorney, Agent, or Firm* — Locke Lord LLP; Tim Tingkang Xia, Esq.

(57) ABSTRACT

The present invention provides an audiovisual access criterion updating method, for updating an audiovisual access criterion in an audiovisual access criterion managing device, the audiovisual access criterion managing device managing the audiovisual access criterion of a content signal, the audiovisual access criterion updating method includes: a step of receiving update information descriptive of update content of the audiovisual access criterion and identification information of the audiovisual access criterion managing device by an updating code generating system; a step of generating an updating code by the updating code generating system according to the update information and the identification information; a step of receiving the updating code by the audiovisual access criterion managing device; and a step of updating the audiovisual access criterion by the audiovisual access criterion managing device according to the updating code.

17 Claims, 11 Drawing Sheets

(51) Int. Cl.
*H04N 21/2543* (2011.01)
*H04N 21/278* (2011.01)
*H04N 21/475* (2011.01)
*H04N 21/237* (2011.01)
*H04N 21/254* (2011.01)
*H04N 21/418* (2011.01)
*H04N 21/4623* (2011.01)
*H04N 21/4627* (2011.01)
*H04N 21/8355* (2011.01)

(52) U.S. Cl.
CPC ... *H04N 21/2543* (2013.01); *H04N 21/26606* (2013.01); *H04N 21/26613* (2013.01); *H04N 21/278* (2013.01); *H04N 21/4181* (2013.01); *H04N 21/4623* (2013.01); *H04N 21/4627* (2013.01); *H04N 21/4753* (2013.01); *H04N 21/8355* (2013.01)

(56) References Cited

U.S. PATENT DOCUMENTS

2015/0127554 A1* 5/2015 Steif ............... H04M 15/48
 705/72
2017/0264965 A1* 9/2017 Gerhards ........... H04N 21/6334

FOREIGN PATENT DOCUMENTS

| JP | 2004-186715 A | 7/2004 |
| JP | 2009-535895 A | 10/2009 |
| JP | 2014-220800 A | 11/2014 |

\* cited by examiner

| IC card | CAS client ID | Km |
|---------|---------------|-----|
| R1 | C1 | Km1 |
| R2 | C2 | Km2 |
| ... | ... | ... |
|  |  |  |
|  |  |  |

| CAS client ID | Km | Serial number |
|---|---|---|
| C1 | Km1 | 0 |
| C2 | Km2 | 1 |
| ... | ... | ... |
| | | |
| | | |

AUDIOVISUAL ACCESS CRITERION UPDATING METHOD, UPDATING CODE GENERATING SYSTEM, UPDATING CODE GENERATING DEVICE, AUDIOVISUAL ACCESS CRITERION MANAGING DEVICE, CONTENT RECEIVING SYSTEM, AND CONTENT DISTRIBUTION SYSTEM

RELATED APPLICATIONS

This application claims priority to Taiwan Application Serial Number 105127411, filed on Aug. 26, 2017, which is incorporated by reference herein in its entirety.

BACKGROUND OF THE INVENTION

Field of the Invention

The present invention relates to an audiovisual access criterion updating method, an updating code generating system, an updating code generating device, an audiovisual access criterion managing device, a content receiving system, and a content distribution system.

Description of the Prior Art

It is a current trend to distribute content signals from broadcast stations and then play the content signals with an electronic machine, such as a smartphone, a personal computer, and a TV set. Content signals are encoded and distributed so as to protect distribution-related interests of a content distributor engaged in a paid broadcast service. In this regard, only those users which entered into a contract with the content distributor can decode the content signals and thereby watch and listen to the contents. An audiovisual access criterion has to be updated whenever a user wants to extend an audiovisual access deadline for the content or wants to watch and listen to content from another content distributor.

Citation 1 discloses a method of initializing an audiovisual access deadline but does not mention updating the audiovisual access deadline. Citation 2 discloses a method of setting a validity deadline by a broadcast wave but has a drawback: the validity deadline cannot be set, unless the broadcast wave carries validity deadline information.

PRIOR ART DOCUMENT

Patent Document

[Citation 1] Japan 特開平 9-139930 [Japan published patent application 9-139930]
[Citation 2] Japan 特開 2000-41231 [Japan published patent application 2000-41231]

SUMMARY OF THE INVENTION

Issue

In view of the aforesaid drawback of the prior art, it is the objective of the present invention to provide an audiovisual access criterion updating method for updating an audiovisual access criterion appropriately, an updating code generating system, an updating code generating device, an audiovisual access criterion managing device, a content receiving system, and a content distribution system.

Solution

The present invention provides, in an embodiment thereof, an audiovisual access criterion updating method, for updating an audiovisual access criterion in an audiovisual access criterion managing device, the audiovisual access criterion managing device managing the audiovisual access criterion of a content signal, the audiovisual access criterion updating method comprising: a step of receiving update information descriptive of update content of the audiovisual access criterion and identification information of the audiovisual access criterion managing device by an updating code generating system; a step of generating an updating code by the updating code generating system according to the update information and the identification information; a step of receiving the updating code by the audiovisual access criterion managing device; and a step of updating the audiovisual access criterion by the audiovisual access criterion managing device according to the updating code.

Given the aforesaid structure, the audiovisual access criterion is updated by the updating code.

The audiovisual access criterion managing device is a receiver for receiving the content signal, and the audiovisual access criterion managing device receives the updating code which the user manually input into the receiver.

Given the aforesaid structure, since the updating code is manually input, no mechanism for receiving the updating code has to be mounted in the receiver, thereby reducing the manufacturing cost of the receiver.

The step of generating the updating code may preferably involve generating the updating code inclusive of a serial number with different values in each instance of generating the updating code.

Given the aforesaid structure, since the updating code includes a serial number, one updating code that can only update the audiovisual access criterion once can be realized.

The step of generating the updating code may preferably involve encoding the update information by a specific key possessed by the audiovisual access criterion managing device and shown by the identification information to thereby generate the updating code.

Given the aforesaid structure, with the updating code being generated by encoding the update information by a specific key, every updating code is applicable to just one audiovisual access criterion managing device.

The present invention provides, in an embodiment thereof, an updating code generating system, for generating an updating code for updating an audiovisual access criterion in an audiovisual access criterion managing device managing the audiovisual access criterion of a content signal, the updating code generating system comprising: a billing device for performing billing as soon as the updating code is generated; and an updating code generating device, which is a separate device from the billing device, for generating the updating code by a key possessed by the audiovisual access criterion managing device using the updating code.

Given the aforesaid structure, with the updating code generating system being equipped with the billing device and the updating code generating device separately, billing can be carried out by a cheap universal device to reduce costs, whereas the updating code is generated by a high-security device to hide specific keys securely.

The present invention provides, in an embodiment thereof, an updating code generating device, for generating an updating code for updating an audiovisual access criterion in an audiovisual access criterion managing device managing the audiovisual access criterion of a content signal, the updating code generating device comprising: a receiving module for receiving update information descriptive of update content of the audiovisual access criterion, and identification information of the audiovisual access criterion managing device; and a generating module for generating the updating code by encoding the update information by a specific key possessed by the audiovisual access criterion managing device and shown by the identification information.

Given the aforesaid structure, with the updating code being generated by encoding the update information by a specific key, every updating code is applicable to just one audiovisual access criterion managing device.

The updating code inclusive of a serial number with different value may be generated in each instance of generating the updating code by the generating module.

Given the aforesaid structure, since the updating code includes a serial number, one updating code that can only update the audiovisual access criterion once can be realized.

The present invention provides, in an embodiment thereof, an audiovisual access criterion managing device, adapted to send a key for decoding an encoded content signal to a receiver for receiving the encoded content signal when an audiovisual access criterion is met, the audiovisual access criterion managing device comprising: an audiovisual access criterion updating module for updating the audiovisual access criterion according to an updating code which is manually input into the receiver by a user and corresponds to identification information of the audiovisual access criterion managing device and update content of the audiovisual access criterion.

Given the aforesaid structure, the audiovisual access criterion can be updated by the updating code.

The updating code may be preferably generated by the audiovisual access criterion updating method, the updating code generating system, or the updating code generating device.

The updating code may preferably include a serial number indicative of a number of times the updating code has ever been generated, and the audiovisual access criterion managing device has a memory module for storing the number of times the audiovisual access criterion has ever been updated, the audiovisual access criterion updating module compares the serial number with the number of times the audiovisual access criterion has ever been updated and thereby determines whether to update the audiovisual access criterion.

Given the aforesaid structure, the updating code includes a serial number, and the audiovisual access criterion managing device stores the number of times the audiovisual access criterion has ever been updated, allowing the audiovisual access criterion to be updated just once by one updating code.

The receiver receives date information descriptive of a distribution date of the encoded content signal, whereas the audiovisual access criterion updating module updates the audiovisual access deadline associated with the audiovisual access criterion according to the date information.

Given the aforesaid structure, the audiovisual access deadline is appropriately updated according to the date information.

The present invention provides, in an embodiment thereof, an audiovisual access criterion managing device, comprising: a first receiving module for receiving an updating code about extending an audiovisual access time period of a content signal by a specified time period, and an audiovisual access criterion updating module for updating an audiovisual access deadline for the content signal according to a date of receiving the content signal for a first time and the specified time period after receiving the updating code.

Given the aforesaid structure, after the updating code has been input, the date of receiving the content signal for the first time is regarded as a standard, and thus assure the user being allowed for the audiovisual access time period.

The audiovisual access criterion managing device may be a receiver for receiving the content signal, whereas the first receiving module receives the updating code input manually into the receiver by the user.

Given the aforesaid structure, since the updating code is manually input, no mechanism for receiving the updating code has to be mounted in the receiver, thereby reducing the manufacturing cost of the receiver.

The audiovisual access criterion managing device may further comprise a second receiving module for receiving date information about a distribution date of the content signal, wherein the audiovisual access criterion updating module defines a date of receiving the content signal for a first time after having received the updating code according to the date information.

Given the aforesaid structure, the audiovisual access deadline is appropriately set, because of the use of the tamper-resistant date information.

The present invention provides, in an embodiment thereof, a content receiving system, comprising: a receiver for receiving an encoded content signal and showing date information of a distribution date of the content signal; and the audiovisual access criterion managing device, wherein the audiovisual access criterion managing device sends a key for decoding the encoded content signal to the receiver when the audiovisual access criterion is met, as determined according to the date information, wherein the receiver decodes the encoded content signal as soon as the key for decoding the content signal is sent.

The present invention provides, in an embodiment thereof, a content distribution system, comprising: a broadcast device; a receiver; an IC card inserted into the receiver; a play device not having a tuner for processing a broadcast wave from the broadcast device; and an updating code generating system; wherein the broadcast device comprises: a first encoding module (11) for encoding, by a first key (Ks), a content signal to generate an encoded content signal; a second encoding module (12) for encoding, by a second key (Kw), the first key (Ks) and date information descriptive of a distribution date of the content signal to generate first control information (ECM); and a third encoding module (14), by a third key (Km) in the IC card, for encoding the second key (Kw) to generate second control information (EMM); the encoded content signal, the first control information (ECM) and the second control information (EMM) are transmitted to the receiver by the broadcast wave, wherein the receiver comprises: a tuner (21) for processing the encoded content signal, the first control information (ECM) and the second control information (EMM); a first decoding module (22) for decoding the encoded content signal when the IC card sends the first key (Ks) and thereby restoring the content signal; and a first receiving module (23) for receiving an updating code input manually by a user, wherein the updating code is generated by encoding, with the third key (Km), update content of an audiovisual access criterion and a serial number showing a number of times the updating code has ever been generated; wherein the restored content signal is played by the play device, the IC card comprises: a second decoding module (31) for receiving the second control information (EMM) through the receiver, decoding the second control information (EMM) by the third key (Km) of the IC card, and thereby restoring the second key (Kw); a third decoding module (32) for receiving the first control information (ECM) through the receiver, decoding the first control information (ECM) by the restored second key (Kw), and thereby restoring the first key (Ks) and the date information; an audiovisual access criterion setting module (34) for setting an audiovisual access deadline of the content signal to a last day of a predetermined audiovisual access time period from a date indicated by the date information when the encoded content signal is received for the first time; a deadline determining module (352) for determining whether to send the first key (Ks) by comparing the date indicated by the date information with the audiovisual access deadline when the encoded content signal is received; an output module (353) for sending the first key to the receiver when the determination is affirmative; a fourth decoding module (36) for receiving the encoded updating code through the receiver and decoding the encoded updating code by the third key (Km) of the IC card; a memory module (33) for storing data about the number of times the audiovisual access criterion has ever been updated; and an audiovisual access criterion updating module (37) for updating the audiovisual access criterion according to the updating code and the date information when the number of times the audiovisual access criterion has ever been updated equals the serial number included in the updating code; wherein the updating code generating system comprises: a billing device (51) for performing billing as soon as the updating code is generated; and an updating code generating device (52) for generating the updating code; wherein the billing device (51) comprises: a second receiving module (511) for receiving update information descriptive of update content for the audiovisual access criterion and the IC card identification information; and a billing module (512) for performing billing according to the update content; wherein the updating code generating device (52) comprises: a third receiving module (521) for receiving the update information and the identification information; and a generating module (523) for generating the updating code by encoding the update information and the serial number with the third key (Km) possessed by the IC card and shown by the identification information.

Advantage of the Invention

It updates an audiovisual access criterion appropriately.

BRIEF DESCRIPTION OF THE DRAWINGS

FIG. 3 is a schematic view of data mode-related data stored in a memory module 13;
FIG. 6 is a schematic view of memory content of a memory module 522.

DETAILED DESCRIPTION OF THE EMBODIMENTS

The embodiment of the present invention is hereunder illustrated by drawings and described in detail.

Figure 1:
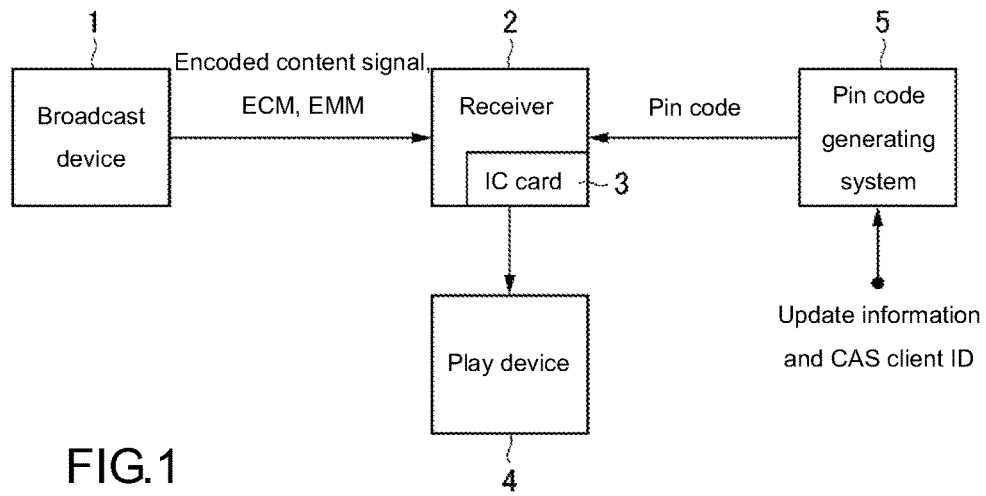
FIG. 1 is a block diagram of a content distribution system.

FIG. 1 is a block diagram of a content distribution system. The content distribution system comprises a broadcast device 1, a receiver 2, an IC card (audiovisual access criterion managing device) 3, a play device 4, and a Pin code generating system 5. The diagram shows one receiver 2, one IC card 3 and one play device 4; however, they are usually provided in a plural number, so is the broadcast device 1. Audiovisual access means watching and listening to content signals. Audiovisual access criterion means a criterion for determining whether audiovisual access is allowed.

The broadcast device 1 is, for example, provided in a broadcast station to transmit, by a broadcast wave, an encoded content signal as well as control information entitlement control message (ECM) and entitlement management message (EMM) to be described later.

The receiver 2 is operated by a user to receive the encoded content signal and the control information ECM, EMM and forward the control information ECM, EMM to the IC card 3.

The user inserts the IC card 3 into the receiver 2 to manage a playing criterion for a content signal, that is, an audiovisual access criterion for the content signal. It is only when the audiovisual access criterion is met that the IC card 3 transmits to the receiver 2 a key Ks (scrambling key) for use in decoding the encoded content signal. When the receiver 2 receives the key Ks, the encoded content signal can be decoded by the key Ks. The decoded content signal is played by the play device 4.

At the user's request, the Pin code generating system 5 fetches update information and CAS client ID (to be described later) and generates a Pin code (updating code) for updating the audiovisual access criterion in the IC card 3. The Pin code is sent to the IC card 3 through the receiver 2 to update the audiovisual access criterion.

In an embodiment, the receiver 2 is a dongle, whereas the play device 4 is a smartphone connected to the dongle. Given the aforesaid structure, even though the smartphone is not equipped with any tuner and thus is unable to process a broadcast wave, the user may still use the smartphone to receive content signals. In an embodiment, the receiver 2 is a set top box, whereas the play device 4 is a display unit connected to the set top box by an HDMI® cable. Alternatively, the receiver 2 is built in the play device 4. Alternatively, an IC functions as a play management device equivalent to the IC card 3 can be mounted inside the receiver 2.

Figure 2:
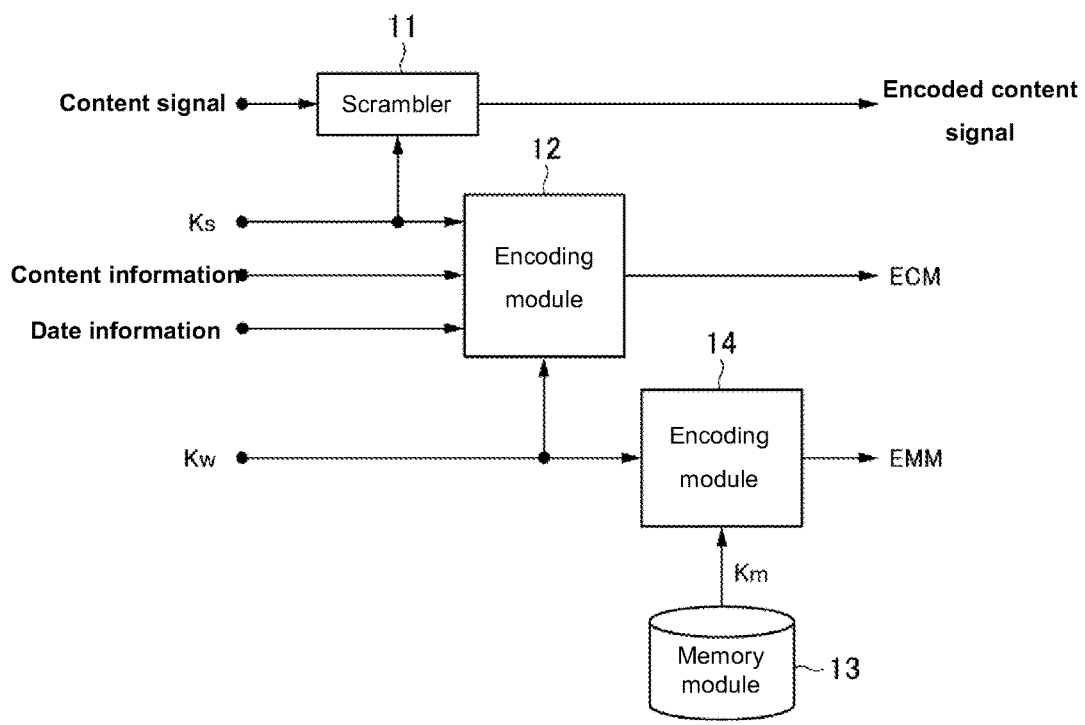
FIG. 2 is a block diagram of a broadcast device 1 according to an embodiment of the present invention.

The present invention is hereunder described in detail.
FIG. 2 is a block diagram of the broadcast device 1 according to an embodiment of the present invention. The broadcast device 1 comprises a scrambler 11 (encoding module), an encoding module 12, a memory module 13, an encoding module 14, and a transmitting module 15.

The scrambler 11 uses the key Ks to scramble (encode) the content signal. The content signal is, for example, a video signal and an audio signal. The encoded content signal thus generated will not be played unless by the key Ks. The key Ks, which is in the possession of the broadcast device 1, neither varies with the receiver 2 at each receiving end nor varies with each content.

The encoding module 12 uses a key Kw (operating key) to encode the key Ks, content information and date information and thereby generate the control information ECM. The key Kw, which is in the possession of the broadcast device 1, neither varies with the receiver 2 at each receiving end nor varies with each content.

The content information is about a broadcast service provider associated with a content signal. The content signal relates to information about paid broadcast or free broadcast, or information whereby a corresponding content signal is identified, and is also known as a tier. Only those users who entered into a contract of subscribing to paid broadcast service can have audiovisual access to content signals provided by the paid broadcast service. Even without the contract, every user can access free broadcast service whereby s/he can have audiovisual access to content signals provided by the free broadcast service.

The date information is not only about the distribution date of the content signal but also about time (hh:mm). The date information is tamper-resistant.

Figure 3:
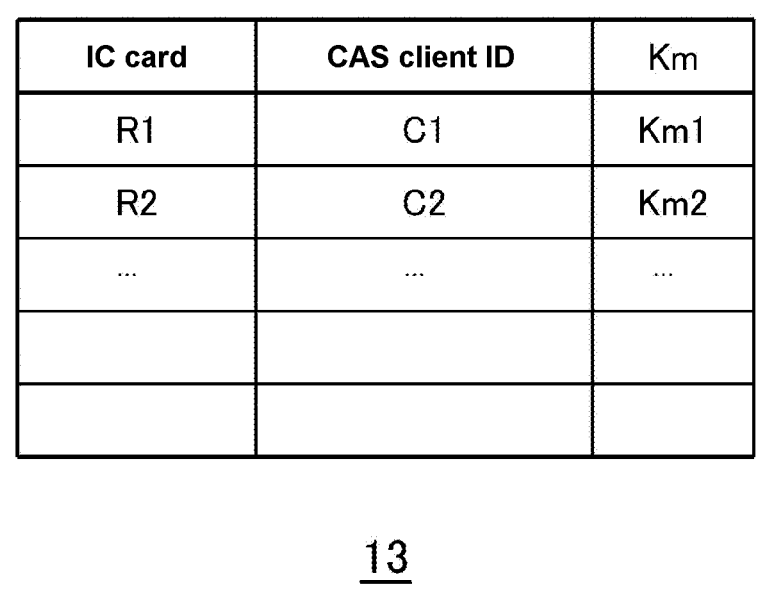

FIG. 3 is a schematic view of data mode-related data stored in a memory module 13. As shown in the diagram, a CAS client ID (identification information about the IC card 3) of the IC card 3 and a key Km are correlated and their data is stored in the memory module 13

Referring back to FIG. 1, the encoding module 14 generates the control information EMM to be transmitted to the IC card 3. The encoding module 14 encodes the key Kw by the key Km in the possession of the IC card 3 in accordance with the memory module 13 and thereby generates the control information EMM for use by the IC card 3.

Referring to FIG. 3, the encoding module 14 encodes the key Kw by the key Km1 in order to generate the control information EMM for use by the IC card 3 when the CAS client ID is denoted by C1.

The encoded content signal and the control information ECM, EMM are transmitted from the broadcast device 1 to the receiver 2 by the broadcast wave. The encoded content signal and the control information ECM are transmitted together, whereas the control information EMM can be transmitted at any time. The control information EMM is for use by the IC card 3; hence, the control information EMM may also be transmitted by a means for providing communication to therefore save the bandwidth for transmission of the broadcast wave. The receiver 2 will not be required to be capable of communication, provided that the control information EMM is transmitted by a means for providing communication.

Figure 4:
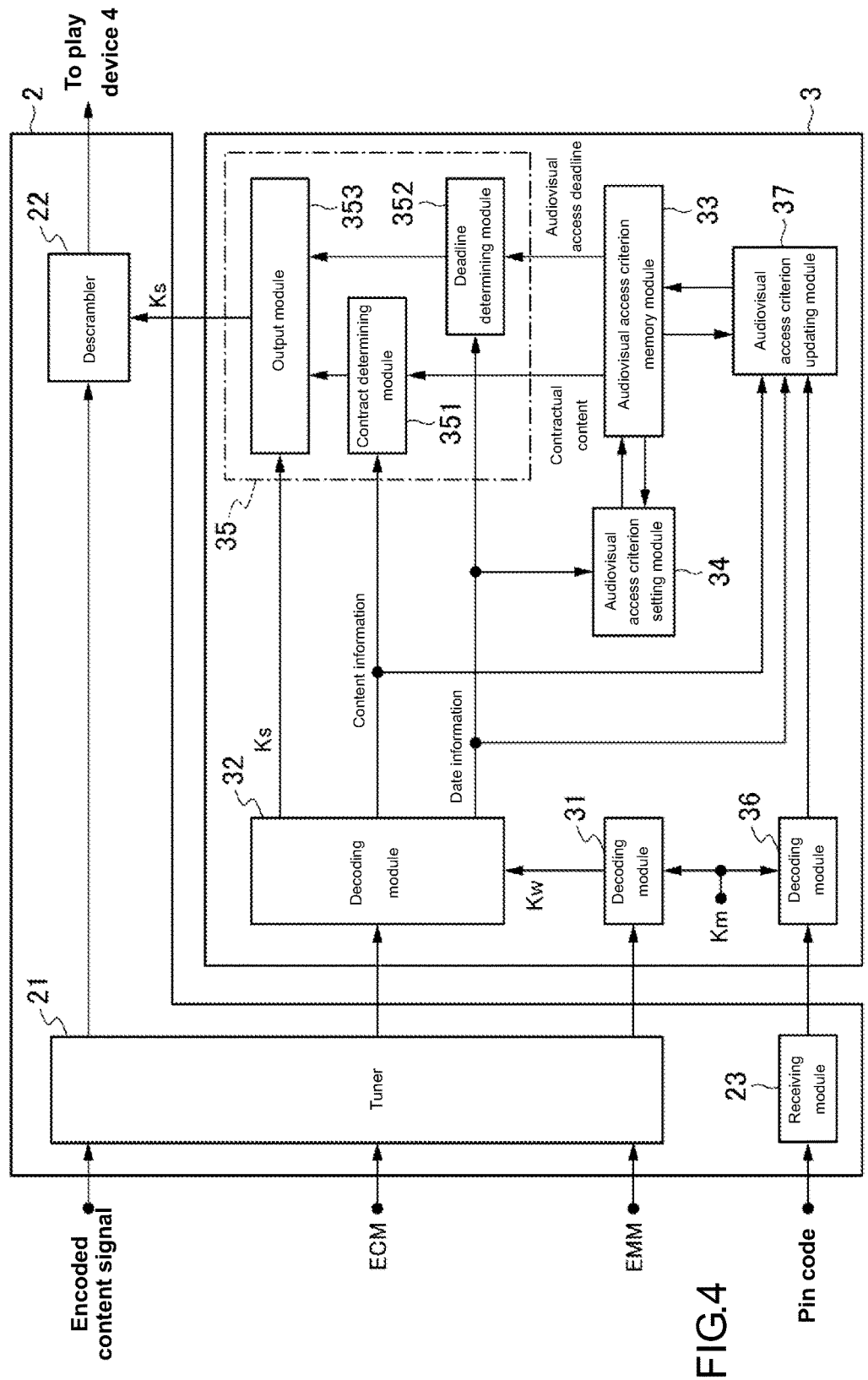
FIG. 4 is a block diagram of a receiver 2 and an IC card 3 according to an embodiment of the present invention.

FIG. 4 is a block diagram of the receiver 2 and the IC card 3 according to an embodiment of the present invention.

The receiver 2 comprises a tuner 21 and a descrambler 22 (decoding module).

The tuner 21 receives the encoded content signal and the control information ECM, EMM from the broadcast wave and chooses a channel according to the users' setting as needed. The encoded content signal is supplied to the descrambler 22, whereas the control information ECM, EMM is forwarded to the IC card 3.

The descrambler 22 uses the key Ks to descramble (decode) the encoded content signal. That is, the descrambler 22 decodes the encoded content signal when the IC card 3 has sent the key Ks. However, the descrambler 22 cannot descramble the encoded content signal when the IC card 3 has not sent the key Ks. The descrambled content signal is converted into a video signal and/or an audio signal to be sent to the play device 4.

The IC card 3 comprises decoding modules 31, 32, an audiovisual access criterion memory module 33, an audiovisual access criterion setting module 34, and a controlling module 35. Also, the CAS client ID (identification information, not shown) is allocated to and stored in the IC card 3. The CAS client ID is recorded in the IC card 3 or displayed on the play device 4 through the receiver 2 so that the user is well informed of the CAS client ID of the IC card 3 in his or her possession.

The decoding module 31 is also a receiving module for receiving the control information EMM and decodes it by the key Km in the possession of the IC card 3 to thereby restore the key Kw. The restored key Kw is supplied to the decoding module 32.

The decoding module 32 is also a receiving module for receiving the control information ECM and decodes it by the key Kw to thereby restore the key Ks, content information and date information. The restored key Ks, content information and date information are supplied to the controlling module 35. The content information is also supplied to the audiovisual access criterion updating module 37. The date information is also supplied to the audiovisual access criterion setting module 34 and the audiovisual access criterion updating module 37.

Data about a contractual content and data about an audiovisual access time period is stored in the audiovisual access criterion memory module 33 to define an initialized state at delivery.

The contractual content shows the broadcast service provider which entered into a contract of subscribing to service of providing audiovisual access to content provided by the broadcast service provider. In this embodiment, the broadcast service provider exists as a broadcast service provider 1 and a broadcast service provider 2. The contractual content exists in two categories: a "single-channel contract" under which audiovisual access to the content provided by the broadcast service provider 1 is allowed; and an "all-channel contract" under which audiovisual access to the content provided by the broadcast service provider 1 and the broadcast service provider 2 is allowed.

The audiovisual access time period is the time period of allowable audiovisual access to content provided by the broadcast service provider which entered into the contract. Alternatively, an audiovisual access deadline substitutes for the audiovisual access time period, though the audiovisual access time period is preferred. The audiovisual access time period varies from broadcast service provider to broadcast service provider.

The data about the audiovisual access deadline is stored in the audiovisual access criterion setting module 34 rather than the audiovisual access criterion memory module 33 in initialized state. As soon as the IC card 3 starts operating, data about the contractual content and data about the audiovisual access deadline is stored in the IC card 3 and available for use by the controlling module 35. Since the data about the contractual content and data about the audiovisual access deadline is stored in the audiovisual access criterion memory module 33, the contractual content and the audiovisual access deadline can be updated by the audiovisual access criterion updating module 37 (to be described later). Data about the number of times the audiovisual access criterion has ever been updated (hereinafter referred to as the audiovisual access criterion updating times) is stored in the audiovisual access criterion memory module 33.

The audiovisual access criterion setting module 34 sets the audiovisual access deadline according to the date information included in the control information ECM and the audiovisual access time period-related data stored in the audiovisual access criterion memory module 33 as soon as the audiovisual access criterion setting module 34 receives the broadcast wave from the broadcast service provider for the first time. The audiovisual access criterion setting module 34 sets the audiovisual access deadline to the end of the audiovisual access time period from the date shown in the date information. Data about the audiovisual access deadline thus set is stored in the audiovisual access criterion memory module 33. Hence, no reduction of pre-use audiovisual access time period can occur, and thus assure the user for a certain audiovisual access time period. In the situation where a user receives broadcast service for the first time, the audiovisual access deadline has not been set.

The controlling module 35 comprises a contract determining module 351, a deadline determining module 352, and an output module 353. After receiving the control information ECM, the controlling module 35 determines whether to send to the receiver 2 the key Ks for use in the decoding process.

The contract determining module 351 determines, according to the content information, and the contractual content associated with the audiovisual access criterion, whether to play a content signal. The contract determining module 351 determines that the content signal can be played under a contract (defined by the contractual content) of playing the content signal provided by paid broadcast (defined by content information.) Given free broadcast, the contract determining module 351 determines that a content signal not related to the contractual content can be played. Given paid broadcast, the contract determining module 351 determines that a content signal cannot be played in the absence of a contract of playing the content signal.

The deadline determining module 352 determines that the content signal can be played according to the date information, and the audiovisual access deadline in the audiovisual access criterion. The deadline determining module 352 determines that the content signal can be played when the distribution date (defined by the date information) is the audiovisual access deadline and determines that the content signal cannot be played when the distribution date is after the audiovisual access deadline.

The output module 353 sends the key Ks to the receiver 2, when both the contract determining module 351 and the deadline determining module 352 determine that the content signal can be played. The output module 353 does not send the key Ks to the receiver 2, when at least one of the contract determining module 351 and the deadline determining module 352 determines that the content signal cannot be played.

The controlling module 35 controls, according to the restored content information and date information as well as the audiovisual access criterion-related data stored in the audiovisual access criterion memory module 33, whether it is good enough to supply the key Ks to the receiver 2. The contract determining module 351, the deadline determining module 352 and the output module 353 shown in FIG. 4 serve an exemplary purpose and thus may be provided in a variant embodiment.

Referring to FIG. 4, the receiver 2 further has a receiving module 23, whereas the IC card 3 further has the decoding module 36 and the audiovisual access criterion updating module 37. The receiving module 23, the decoding module 36 and the audiovisual access criterion updating module 37 are for use in updating the audiovisual access criterion by a Pin code and are described later together with the Pin code generating system 5.

Figure 5:
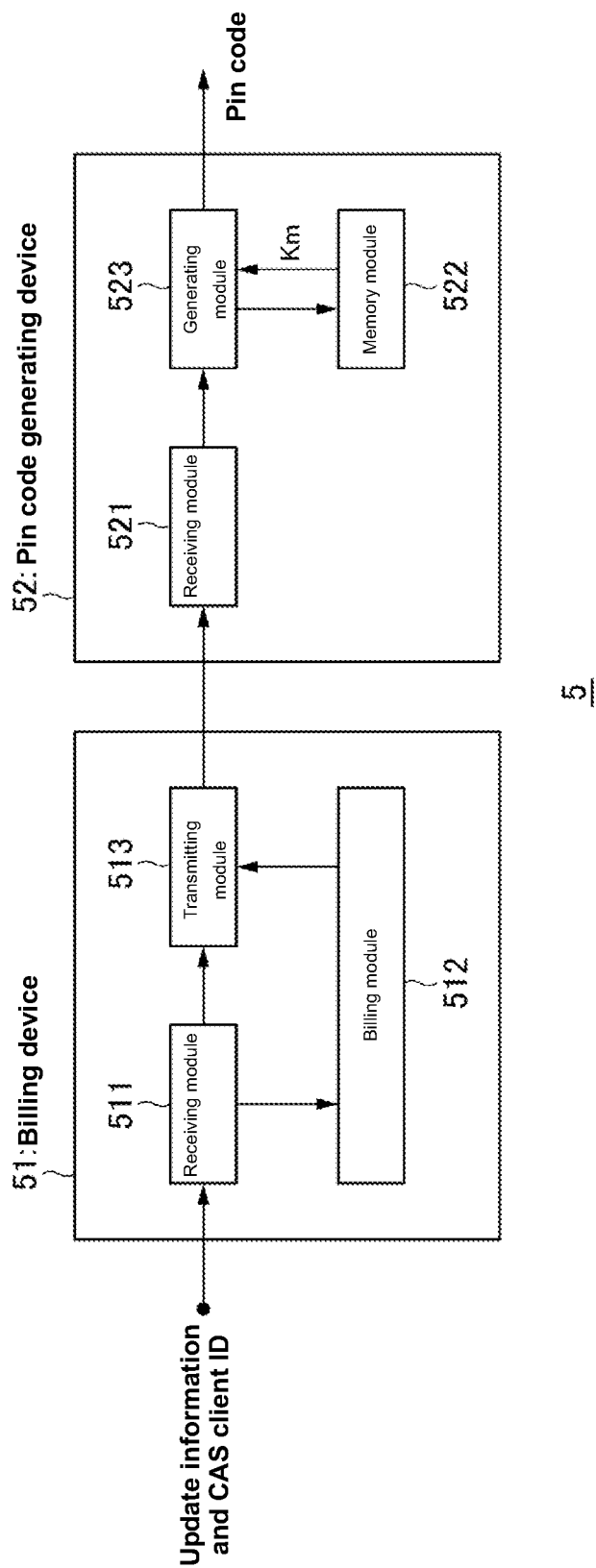
FIG. 5 is a block diagram of a Pin code generating system 5.

FIG. 5 is a block diagram of the Pin code generating system 5. Referring to FIG. 5, the Pin code generating system 5 comprises a billing device 51 and a Pin code generating device 52.

The billing device 51 comprises a receiving module 511, a billing module 512, and a transmitting module 513. The receiving module 511 receives the update information and CAS client ID from the receiver 2 (IC card 3) in the possession of the user. The update information is descriptive of update content for (how to update) the audiovisual access criterion. For example, the update content is intended to extend the audiovisual access time period. The extended audiovisual access time period is either fixed (say, six months) or specified by the user. In another example, the update content is intended to change the contractual content, changing the contractual content from a "single-channel contract" to an "all-channel contract," or changing the contractual content from an "all-channel contract" to a "single-channel contract."

The present invention is not restrictive of the receiving technique for use by the receiving module 511. In a typical example, a technician fetches the update information and CAS client ID from the user by phone or email, and then the receiving module 511 receives the update information and CAS client ID according to the technician's input and operation. Alternatively, when the play device 4 is a smartphone, the play device 4 displays a Website for use in update so that the receiving module 511 can receive the update information and CAS client ID through the Website.

The billing module 512 performs billing according to the update content in the audiovisual access criterion. For example, the billing module 512 performs billing when the audiovisual access time period is extended or when the "single-channel contract" is replaced by the "all-channel contract."

Upon completion of the billing process, the transmitting module 513 transmits the update information and CAS client ID received by the receiving module 511 to the Pin code generating device 52.

The Pin code generating device 52 comprises a receiving module 521, a memory module 522, and a generating module 523.

The receiving module 521 receives the update information and CAS client ID from the transmitting module 513 of the billing device 51 (or directly.)

FIG. 6 is a schematic view of memory content of the memory module 522. As shown in the diagram, data about the CAS client ID, the key Km, and a serial number are correlated and stored in the memory module 522. The serial number is the number of times a Pin code has ever been generated for the same CAS client ID. The serial number is 0 when no Pin code has ever been generated.

Referring back to FIG. 5, the generating module 523 generates a Pin code according to the update information and CAS client ID. The technician transmits the Pin code thus generated to the user by phone or email. Alternatively, when the update information and CAS client ID are transmitted through a Website, the Pin code is displayed on the Website. When a Pin code is generated, the serial number stored in the memory module 522 and correlated with the received CAS client ID is increased by 1 by the generating module 523. An example of a method of generating a Pin code is described below.

Figure 7:
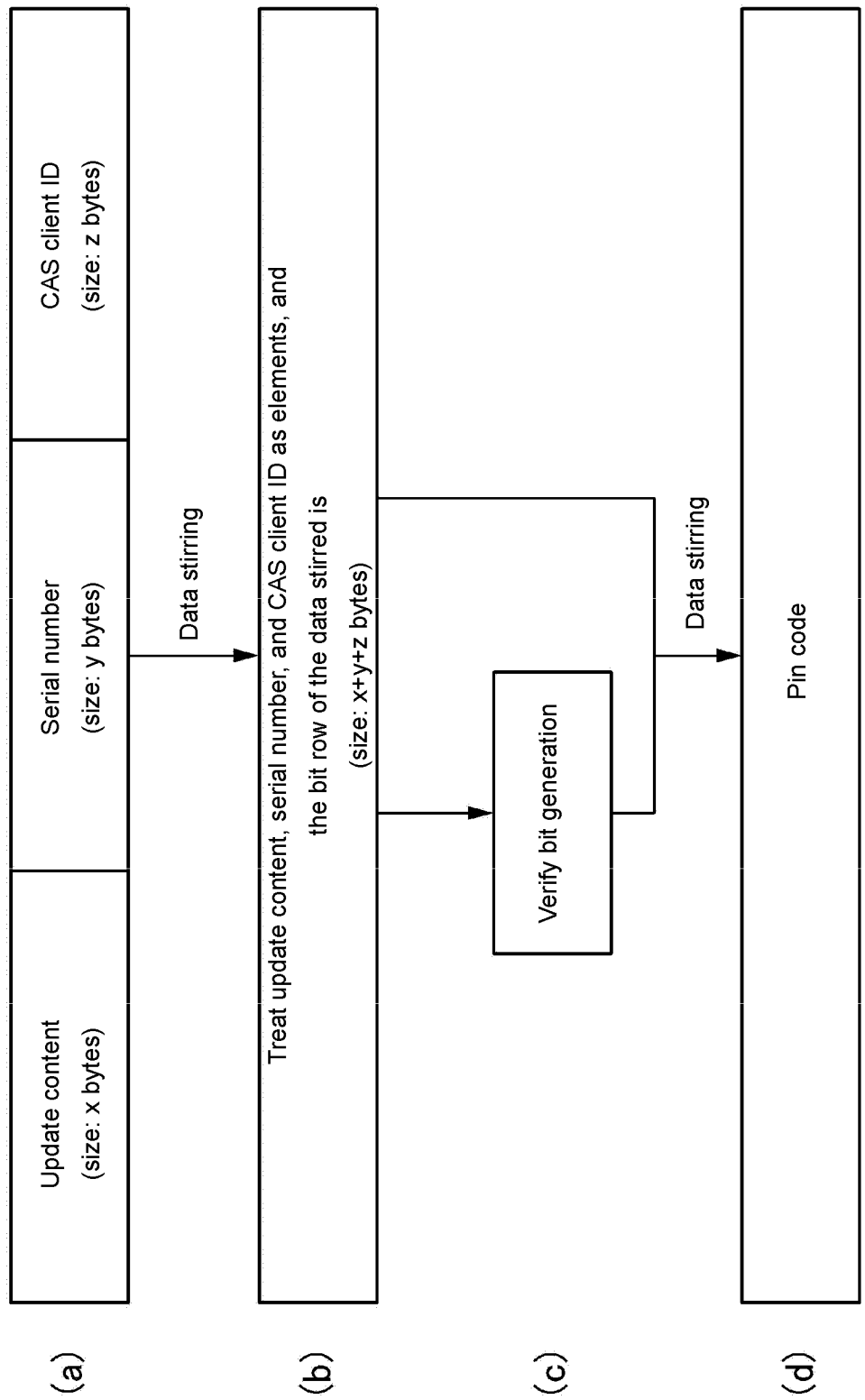
FIG. 7 is a schematic view of a method of generating a Pin code.

FIG. 7 is schematic view of a method of generating a Pin code.

Referring to (a) of FIG. 7, the generating module 523 links the CAS client ID to the serial number received by the receiving module 521 and corresponding to the CAS client ID according to the value of the update content. The linked value is, for example, a hexadecimal value which expresses a binary bit row.

The concept "according to the value of the update content" means, for example, whether or not the audiovisual access time period is extended, what the time period, by which the audiovisual access time period is extended, is, and whether or not the contractual content is changed are expressed by a hexadecimal value in accordance with a specified rule, wherein it is x bytes long in this embodiment. The serial number is y bytes long. Assuming that it is 1 byte long, the update may occur for a maximum 255 times. The CAS client ID is z bytes long. Since the CAS client ID is prohibited from repeating, it is required to be long enough, but 10 bytes are sufficient to identify a sufficiently large number of IC cards 3.

Referring to (b) of FIG. 7, the generating module 523 uses the key Km correlated with the CAS client ID received by the receiving module 521 to reversibly scramble (electronically scramble) the value linked in (a) of FIG. 7, generating a bit row which is (x+y+z) bytes long. Hence, the linked value can restore the original state, only if one IC card 3 of the key Km for use in the aforesaid scrambling is available.

Referring to (c) of FIG. 7, the generating module 523 generates a check bit from an encoded bit row. The check bit can have any length, provided that the length ensures the appropriateness of the bit row generated as shown in (b) of FIG. 7.

Referring to (d) of FIG. 7, the generating module 523 performs common and reversible data scrambling in the content distribution system of this embodiment on at least a module of the bit row and at least a module of the check bit of (b) of FIG. 7 to generate a Pin code.

The generating module 523 converts a hexadecimal value which expresses a bit row of (d) of FIG. 7 into a decimal value to be easily entered by the user. For example, when displayed as a bit row which is 10 byte long, the Pin code of (d) of FIG. 7 can be converted into a decimal value with 24 digits. The user can enter a 24-digit number effortlessly.

A Pin code is generated in a manner described above. The Pin code includes a serial number (the serial number is 0 when the Pin code is generated for the first time). When the user gives the update information about the audiovisual access criterion, different Pin codes are generated, and it is impossible for the same Pin code to be generated for one CAS client ID. Moreover, with the Pin code being encoded by the key Km, only the IC card 3 correlated with the key Km can be involved in the decoding process.

The Pin code generating system 5 in the embodiment illustrated by FIG. 5 is equipped with different devices for effectuating billing and Pin code generation, respectively, to separate billing from Pin code generation. The billing device 51 is a universal device in order to minimize costs. The Pin code generating device 52 manages the key Km strictly to not only prevent it from being divulged but also keep the Pin code generating method secret. In a more specific embodiment, functions of the billing device 51 are provided by application service providers (ASP), and the Pin code generating device 52 can be managed by any broadcast service provider.

In a variant embodiment, the Pin code generating system 5 effectuates billing and Pin code generation with the same device. In another variant embodiment, the Pin code generating system 5 is composed of at least three devices.

Referring back to FIG. 4, the audiovisual access criterion is updated by a Pin code generated in the manner described above.

Referring to FIG. 4, the receiver 2 has a receiving module 23. The receiving module 23 receives a Pin code. The present invention is not restrictive of the receiving method for use by the receiving module 23. In a typical example, the receiving module 23 receives a Pin code input manually by the user. To allow the user to enter a Pin code, the receiver 2 has an input interface, such as a touch panel, a remote controller, or a digital key. A graphical user interface (GUI) adapted to allow the user to enter a Pin code is displayed on the play device 4 as needed. Since the Pin code is input by the user through an input interface and then received, it is not necessary for a Pin code-oriented communication mechanism to be mounted in the receiver 2, thereby reducing the manufacturing cost of the receiver 2 greatly.

In a variant embodiment, a Pin code is transmitted from the Pin code generating system 5 by the broadcast wave or communication and received by the receiving module 23. Alternatively, when the play device 4 is a smartphone, a Pin code is transmitted from the Pin code generating system 5 to the play device 4 by communication, and then the Pin code in the play device 4 is automatically sent to the receiver 2. Therefore, the Pin code generating system 5 is more user-friendly.

The IC card 3 comprises the decoding module 36 and the audiovisual access criterion updating module 37. The decoding module 36 is also a receiving module for receiving a Pin code and decoding the Pin code by the key Km, thereby restoring the update content and the serial number in (d) of FIG. 7. As mentioned before, data about the number of times the audiovisual access criterion has ever been updated is stored in the audiovisual access criterion memory module 33. Hence, the audiovisual access criterion updating module 37 compares the number of times the audiovisual access criterion has ever been updated with the serial number.

Figure 8:
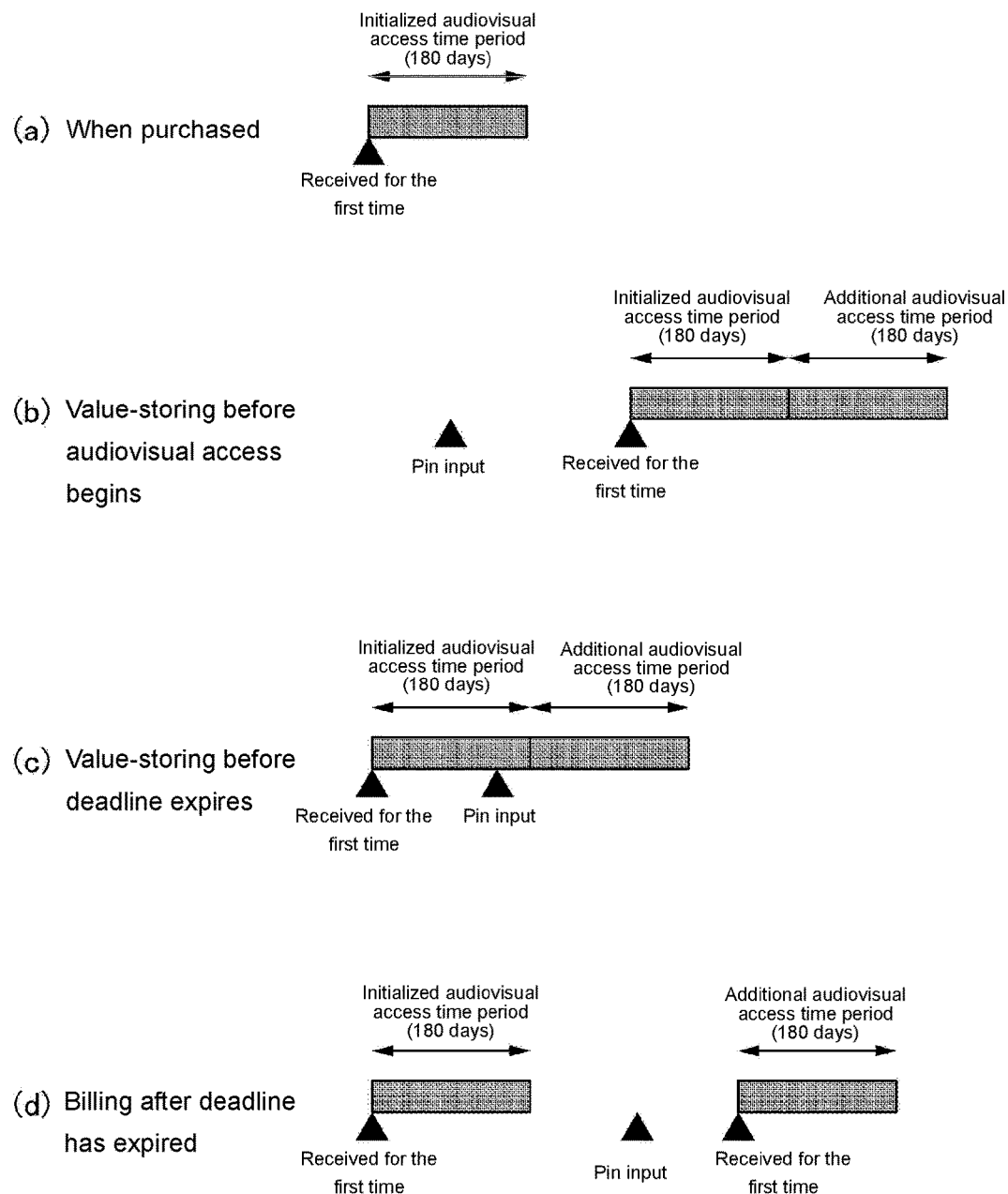
FIG. 8 is a schematic view of extending an audiovisual access time period without changing a contractual content.
Figure 9:
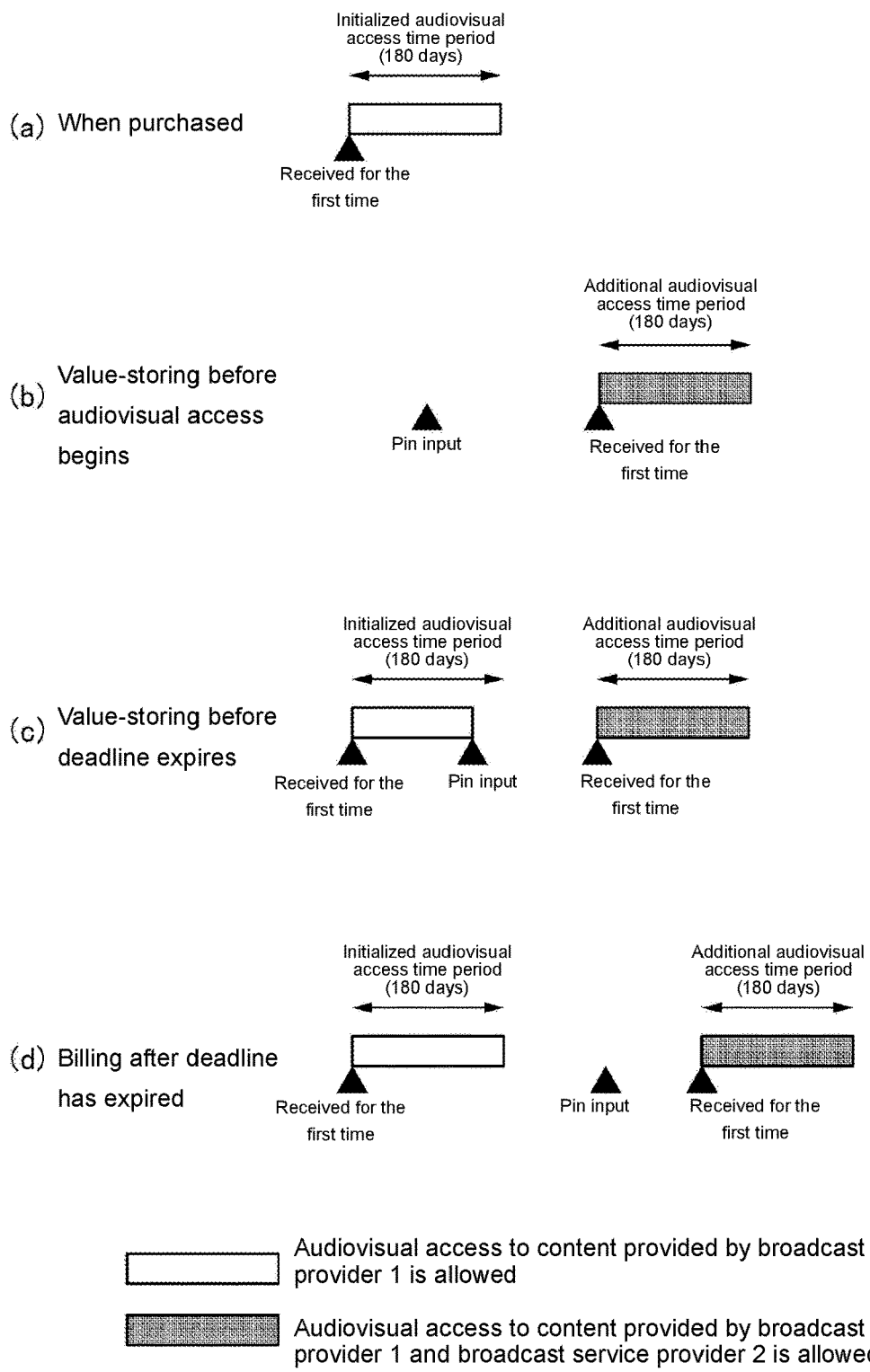
FIG. 9 is a schematic view of changing the contractual content from "single-channel contract" to "all-channel contract"
Figure 10:
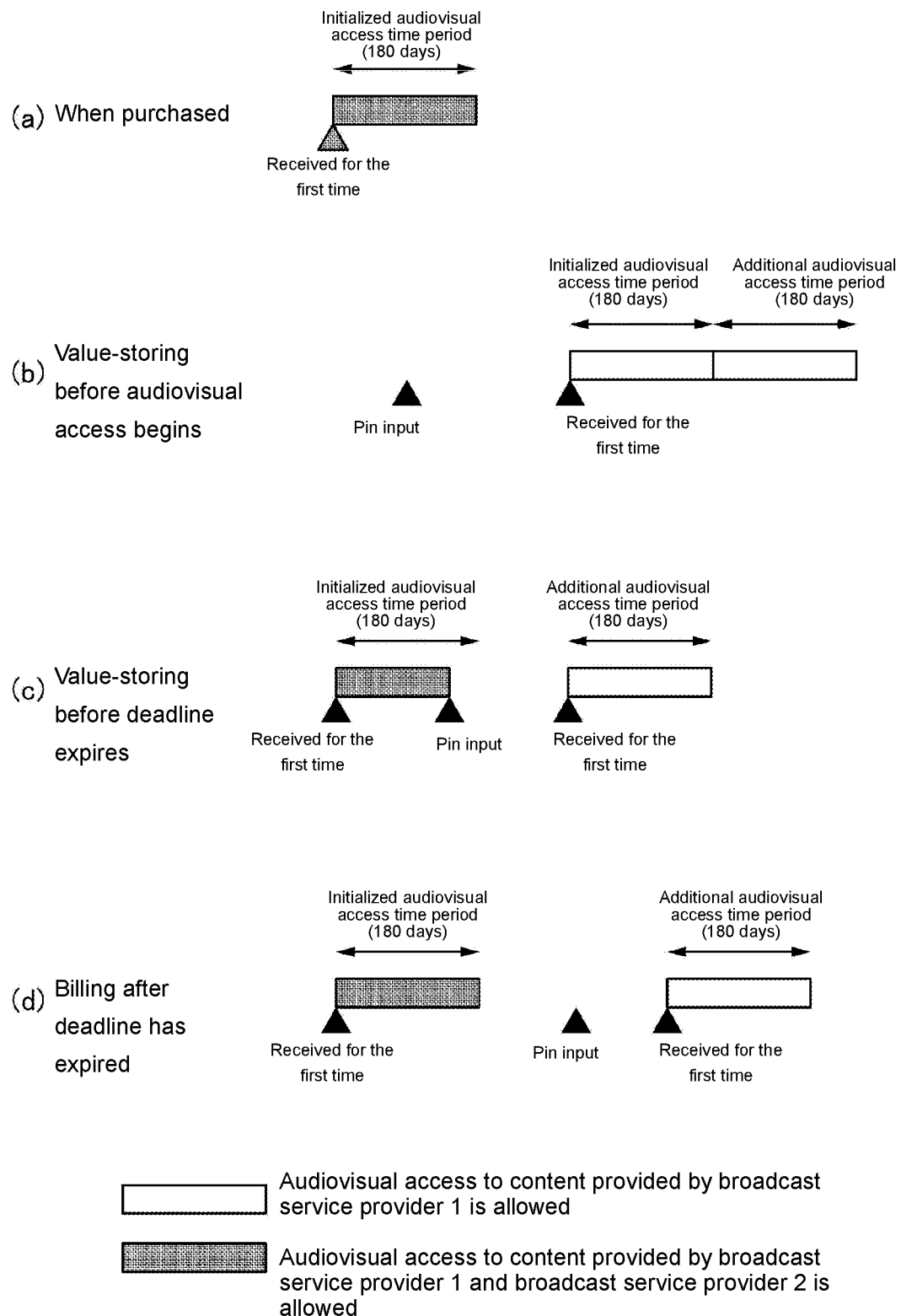
FIG. 10 is a schematic view of changing the contractual content from "all-channel contract" to "single-channel contract"

When the number of times the audiovisual access criterion has ever been updated equals the serial number, the audiovisual access criterion updating module 37 determines that a correct Pin code has been input and updates the audiovisual access criterion in the audiovisual access criterion memory module 33 according to the restored update content and in accordance with the date information and content information as needed. The update is illustrated by FIG. 8 through FIG. 10. After the audiovisual access criterion updating module 37 has updated the audiovisual access criterion, the number of times the audiovisual access criterion stored in the audiovisual access criterion memory module 33 has ever been updated is increased by one.

When the number of times the audiovisual access criterion has ever been updated does not equal the serial number, the audiovisual access criterion updating module 37 does not update the audiovisual access criterion. For instance, if a Pin code which has been input before is input again, the audiovisual access criterion will not be updated, because the number of times the audiovisual access criterion has ever been updated is greater than the serial number in the Pin code. Hence, no single Pin code can be used to effectuate multiple updates. The audiovisual access criterion updating module 37 can display on the play device 4 a message which states that an input Pin code is incorrect, as needed.

As such, a Pin code includes a serial number. Hence, one Pin code can only be used to update the audiovisual access criterion once. To update the audiovisual access criterion once more, the user has to request a Pin code anew. Moreover, the Pin code is encoded by the key Km in the IC card 3. Therefore, one Pin code can be used to update the audiovisual access criterion of the IC card 3 but not the audiovisual access criterion of the other IC cards 3.

In an embodiment described below, the audiovisual access criterion updating module 37 updates the audiovisual access criterion. Memory of the audiovisual access criterion memory module 33 shows a contractual content about which broadcast service provider's content the user can watch and listen to and shows an audiovisual access deadline. The embodiment illustrates the following: an update which involves extending the audiovisual access deadline by a time period (say, 180 days, applicable hereunder) without changing the contractual content (FIG. 8), an update which involves changing the contractual content from a "single-channel contract" to an "all-channel contract" (FIG. 9), and an update which involves changing the contractual content from an "all-channel contract" to a "single-channel contract" update (FIG. 10), and the like, including an update which involves extending the audiovisual access deadline by any time period.

FIG. 8 is schematic view of extending the audiovisual access time period without changing the contractual content. Referring to (a) of FIG. 8, in an initialized state (the state of the IC card 3 obtained by the user), the initialized audiovisual access time period is a 180-days period from the date of receiving the broadcast wave for the first time. That is, the audiovisual access criterion setting module 34 sets the audiovisual access deadline to the $180^{th}$ day from the date of receiving the broadcast wave for the first time. The date of receiving the broadcast wave is defined by the date information included in the control information ECM.

Referring to FIG. (b) of 8, the audiovisual access deadline is extendable before the first instance of audiovisual access begins. (charge before the audiovisual access begins) The audiovisual access time period is 360 days, i.e., the sum of the initialized audiovisual access time period 180 days and the additional audiovisual access time period 180 days. The audiovisual access criterion updating module 37 sets the audiovisual access deadline to the $360^{th}$ day from the date of receiving the broadcast wave for the first time, because 360 days is the sum of the initialized audiovisual access time period of 180 days and the additional audiovisual access time period of 180 days.

Referring to FIG. (c) of 8, the audiovisual access deadline (a value stored before the deadline expires) is extendable after the audiovisual access has begun but before the audiovisual access deadline expires. The additional audiovisual access time period is also 180 days. The audiovisual access criterion updating module 37 sets the audiovisual access deadline to the $180^{th}$ day (because the additional audiovisual access time period is 180 days) from the original audiovisual access deadline.

Referring to FIG. (d) of 8, the audiovisual access deadline is extendable after the audiovisual access deadline has expired (charge after the deadline has expired). The audiovisual access criterion updating module 37 sets the audiovisual access deadline to the $180^{th}$ day (because the additional audiovisual access time period is 180 days) from the date of receiving the broadcast wave for the first time after the Pin code has been input.

FIG. 9 is schematic view of changing the contractual content from a "single-channel contract" to an "all-channel contract". Referring to (a) of FIG. 9, in an initialized state (the state of the IC card 3 obtained by the user), the initialized audiovisual access time period is a 180-days period from the date of receiving the broadcast wave from the broadcast service provider 1 for the first time. That is, the audiovisual access criterion setting module 34 sets the audiovisual access deadline to the $180^{th}$ day from the date of receiving the broadcast wave for the first time. Before the audiovisual access deadline, the receiver 2 can play a content signal from the broadcast service provider 1. The date of receiving the broadcast wave from the broadcast service provider 1 is defined by the date information and content information included in the control information ECM.

Referring to (b) of FIG. 9, before the first instance of audiovisual access begins, it is feasible to switch from the "single-channel contract" to the "all-channel contract" and extend the audiovisual access deadline (a value stored before the audiovisual access begins). The audiovisual access criterion updating module 37 changes the contractual content to the "all-channel contract" and sets the audiovisual access deadline to the $180^{th}$ day from the date of receiving the broadcast wave from the broadcast service provider 1 or the broadcast service provider 2 for the first time. Before the audiovisual access deadline, the receiver 2 can play a content signal from the broadcast service provider 1 and the broadcast service provider 2.

Referring to FIG. (c) of 9, after the audiovisual access has begun but before the audiovisual access deadline expires, it is feasible to switch from the "single-channel contract" to the "all-channel contract" and extend the audiovisual access deadline (a value stored before the deadline expires). The audiovisual access criterion updating module 37 changes the contractual content to the "all-channel contract" and sets the audiovisual access deadline to the $180^{th}$ day from the date of receiving the broadcast wave from the broadcast service provider 1 or the broadcast service provider 2 for the first time after the Pin code has been input. Before the audiovisual access deadline, the receiver 2 can play a content signal from the broadcast service provider 1 and the broadcast service provider 2.

Referring to FIG. (d) of 9, after the audiovisual access deadline has expired, it is feasible to switch from the "single-channel contract" to the "all-channel contract" and extend the audiovisual access deadline (a value stored after the deadline has expired). The audiovisual access criterion updating module 37 changes the contractual content to the "all-channel contract" and sets the audiovisual access deadline to the $180^{th}$ day from the date of receiving the broadcast wave from the broadcast service provider 1 or the broadcast service provider 2 for the first time after the Pin code has been input. Before the audiovisual access deadline, the receiver 2 can play a content signal from the broadcast service provider 1 and the broadcast service provider 2.

FIG. 10 is a schematic view of changing the contractual content from the "all-channel contract" to the "single-channel contract". Referring to FIG. (a) of 10, in an initialized state (the state of the IC card 3 obtained by the user), the initialized audiovisual access time period is a 180-days period from the date of receiving the broadcast wave from the broadcast service provider 1 or the broadcast service provider 2 for the first time. That is, the audiovisual access criterion setting module 34 sets the audiovisual access deadline to the $180^{th}$ day from the date of receiving the broadcast wave from the broadcast service provider 1 or the broadcast service provider 2 for the first time. Before the audiovisual access deadline, the receiver 2 can play a content signal from the broadcast service provider 1 and the broadcast service provider 2. The date of receiving the broadcast wave from the broadcast service provider 1 or the broadcast service provider 2 is defined by the date information and content information included in the control information ECM.

Referring to FIG. (b) of 10, before the first instance of audiovisual access begins, it is feasible to switch from the "all-channel contract" to the "single-channel contract" and extend the audiovisual access deadline (a value stored before the audiovisual access begins). The audiovisual access time period is 360 days, i.e., the sum of the initialized audiovisual access time period of 180 days and the additional audiovisual access time period of 180 days. The audiovisual access criterion updating module 37 changes the contractual content to the "single-channel contract" and sets the audiovisual access deadline to the $360^{th}$ day from the date of receiving the broadcast wave from the broadcast service provider 1 for the first time. Before the audiovisual access deadline, the receiver 2 can play a content signal from the broadcast service provider 1.

Referring to FIG. (c) of 10, after the audiovisual access has begun but before the audiovisual access deadline expires, it is feasible to switch from the "all-channel contract" to the "single-channel contract" and extend the audiovisual access deadline (a value stored before the deadline expires). The audiovisual access criterion updating module 37 changes the contractual content to the "single-channel contract" and sets the audiovisual access deadline to the $180^{th}$ day from the date of receiving the broadcast wave from the broadcast service provider 1 for the first time after the Pin code has been input. Before the audiovisual access deadline, the receiver 2 can play a content signal from the broadcast service provider 1.

Referring to FIG. 10($d$), after the audiovisual access deadline has expired, it is feasible to switch from the "all-channel contract" to the "single-channel contract" and extend the audiovisual access deadline (a value stored after the deadline has expired). The audiovisual access criterion updating module 37 changes the contractual content to the "single-channel contract" and sets the audiovisual access deadline to the $180^{th}$ day from the date of receiving the broadcast wave from the broadcast service provider 1 for the first time after the Pin Code has been entered. Prior to the audiovisual access deadline, the receiver 2 can play a content signal from the broadcast service provider 1.

As described above, in this embodiment, the date information is used not only in the initialization of the audiovisual access deadline but also in an update. The audiovisual access criterion updating module 37 updates the audiovisual access deadline according to the date of receiving a content signal for the first time after the Pin code has been received and the time period, which is included in the Pin code, by which the audiovisual access time period is extended. Hence, the audiovisual access time period does not expire immediately after the Pin code has been entered, and thus the audiovisual access deadline is appropriately updated in accordance with the date of receiving the broadcast wave for the first time (i.e., the date of playing the content signal for the first time) after the Pin code has been entered. Moreover, information pertaining to the required extension time period of 180 days is preferably included in the Pin code manually input to therefore reduce the manufacturing cost of the receiver 2.

Figure 11:
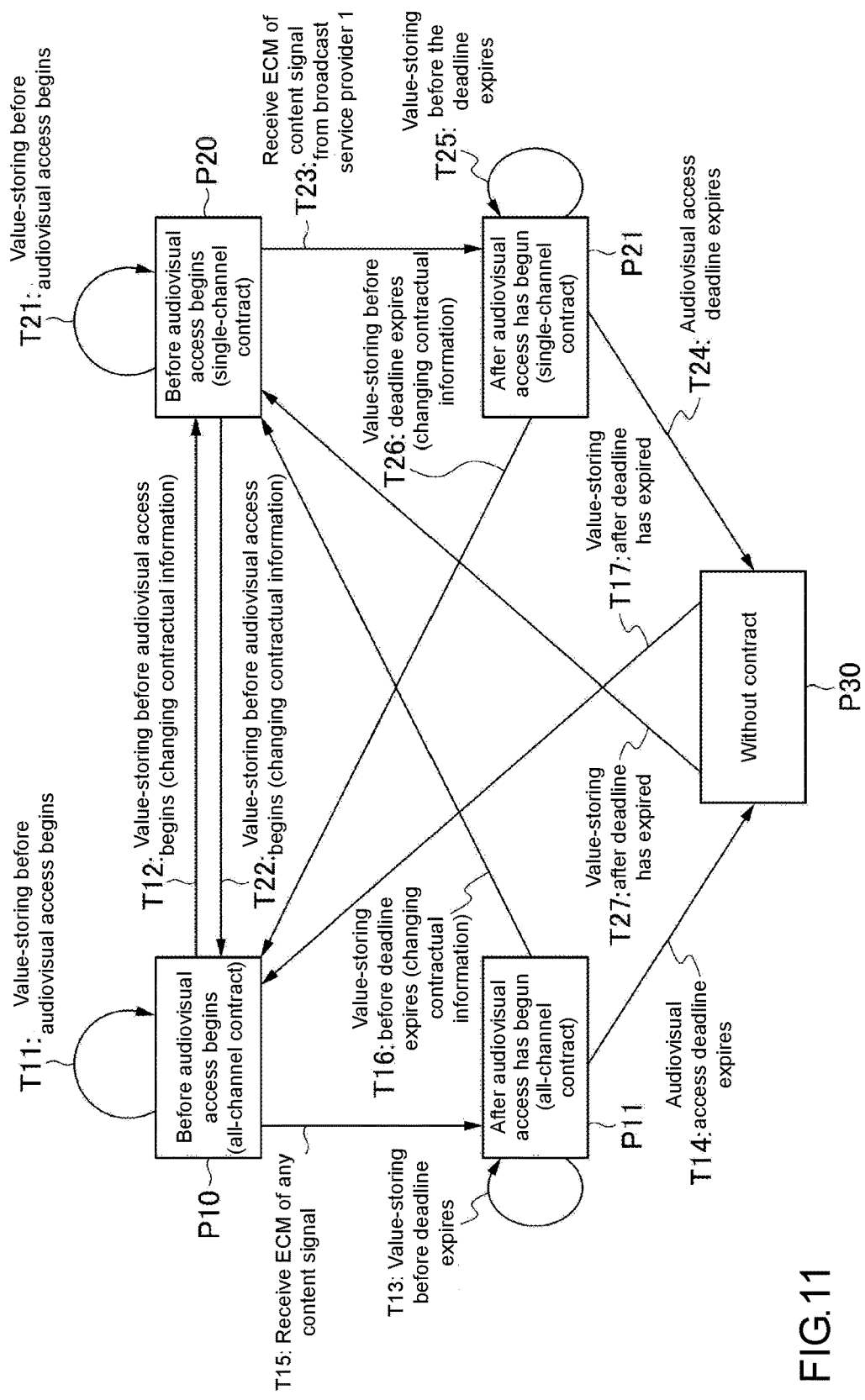
FIG. 11 is a schematic view of changes in the state of the IC card 3.

FIG. 11 is a schematic view of changes in the state of the IC card 3. The initialized state is all-channel contract pre-access state P10 or single-channel contract pre-access state P20. The user chooses to obtain the IC card 3 with one of the states and uses the state as the contractual content for initializing a state stored in the audiovisual access criterion memory module 33. Moreover, the audiovisual access time period is also stored in the audiovisual access criterion memory module 33. In the initialized state, the IC card 3 undergoes value-storing before the audiovisual access begins without changing the contractual content (see (a) of FIG. 8) (T11, T12).

The IC card 3 with all-channel contract pre-access state P10 undergoes value-storing before the audiovisual access begins while changing the contractual content (see FIG. (a) of 10) (T12). Hence, the IC card 3 enters single-channel contract pre-access state P20.

The IC card 3 with single-channel contract pre-access state P20 undergoes value-storing before the audiovisual access begins while changing the contractual content (see FIG. (a) of 9) (T22). Hence, the IC card 3 enters all-channel contract pre-access state P10.

When the IC card 3 with all-channel contract pre-access state P10 receives the control information ECM carried by the encoded content signal from one of the broadcast service provider 1 and the broadcast service provider 2 (T13), the receipt date is the starting date of the audiovisual access time period, and the IC card 3 enters post-access state P11.

When the IC card 3 with single-channel contract pre-access state P20 receives the control information ECM carried by the encoded content signal from the broadcast service provider 1 (T23), the receipt date is the starting date of the audiovisual access time period, and the IC card 3 enters post-access state P21. Even though the IC card 3 receives the control information ECM carried by the encoded content signal from the broadcast service provider 2, the state remains unchanged.

The IC card 3 with all-channel contract post-access state P11 enters contract-less state P30 as soon as the audiovisual access deadline expires (T14). Moreover, the IC card 3 with all-channel contract post-access state P11 undergoes value-storing before the deadline expires without changing the contractual content (see FIG. (c) of 8) (T15); hence, the state of the IC card 3 does not undergo any change. The IC card 3 with all-channel contract post-access state P11 undergoes value-storing before the deadline expires while changing the contractual content (see FIG. (c) of 10) (T16). Hence, the IC card 3 enters single-channel contract pre-access state P20.

The IC card 3 with single-channel contract post-access state P21 enters contract-less state P30 as soon as the audiovisual access deadline expires (T24). Moreover, the IC card 3 with single-channel contract post-access state P21 undergoes value-storing before the deadline expires without changing the contractual content (see FIG. (c) of 8) (T25); hence, the state of the IC card 3 does not undergo any change. Moreover, the IC card 3 with single-channel contract post-access state P21 undergoes value-storing before the deadline expires while changing the contractual content (see FIG. (c) of 9) (T26); hence, the IC card 3 enters all-channel contract pre-access state P10.

A value-storing after the deadline setting the contractual content to an all-channel contract (T17) can be performed on the IC card 3 in a state without contract P30. Hence, the IC card 3 enters all-channel contract pre-access state P10. Moreover, the IC card 3 without contract state P30 sets the contractual content to a value stored after the deadline of the single-channel contract (T27). Hence, the IC card 3 enters single-channel contract pre-access state P20.

The aforesaid change of state of the IC card 3 is triggered by entering the Pin code, receiving the control information ECM, and expiry of the audiovisual access deadline. Afterward, the state of the IC card 3 is set and updated by the audiovisual access criterion setting module 34 or the audiovisual access criterion updating module 37 and stored in the audiovisual access criterion memory module 33.

The process flow of the updating process of the audiovisual access criterion in the content distribution system is described below.

Figure 12:
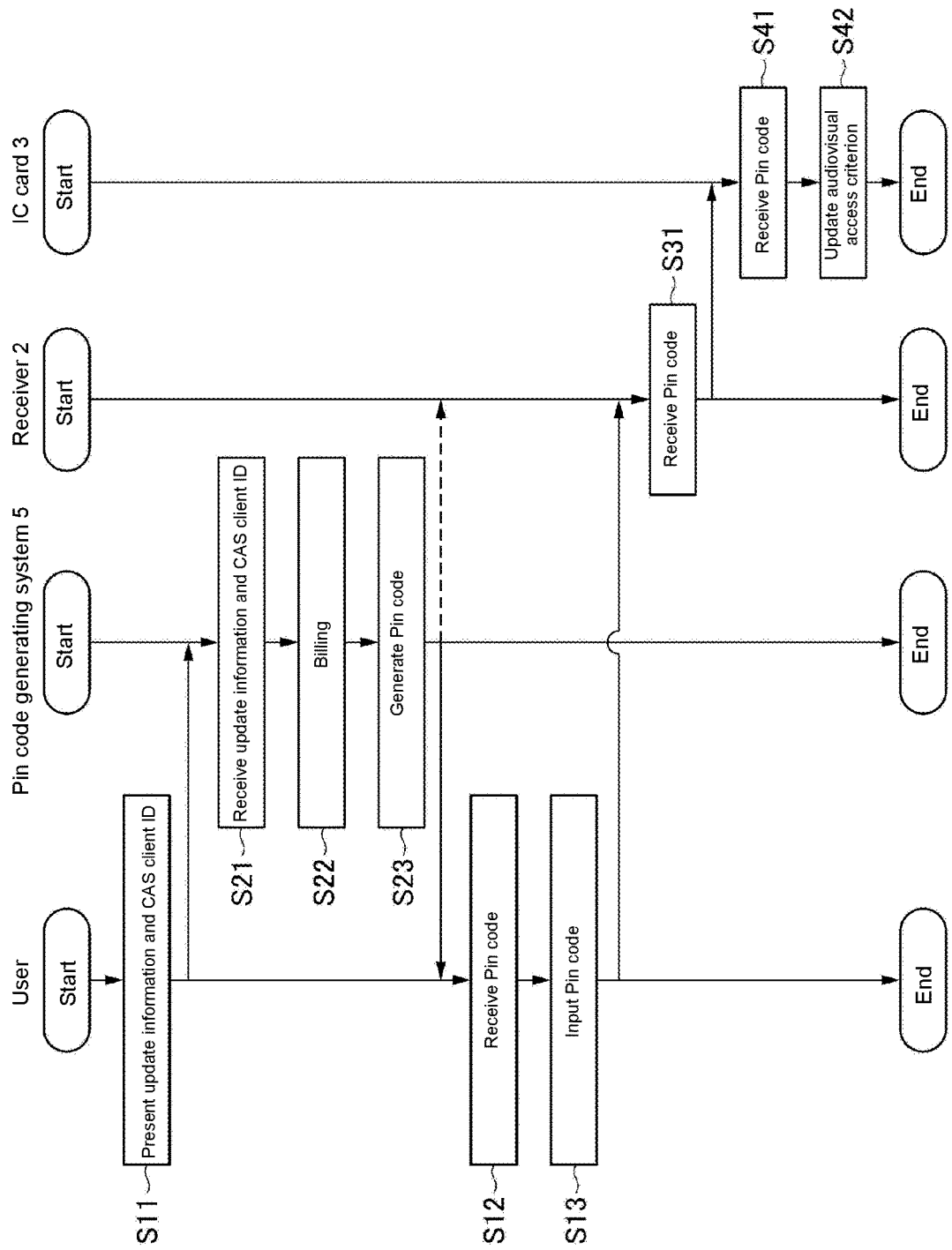
FIG. 12 is a flowchart of an updating process of an audiovisual access criterion.

FIG. 12 is a flowchart of an updating process of an audiovisual access criterion. First, the user directly or indirectly presents the update information about the audiovisual access criterion updating content and the CAS client ID of the IC card 3 to the Pin code generating system 5 (step S11). The update information and the CAS client ID are entered into the Pin code generating system 5.

Therefore, the receiving module 511 of the Pin code generating system 5 receives the update information and the CAS client ID (step S21). As mentioned before, the receiving module 511 receives the update information and the CAS client ID entered by the technician or through the Internet. Afterward, the billing module 512 effectuates billing according to the update information (step S22), and then the generating module 523 generates a Pin code (step S23).

The user receives the generated Pin code (step S12). Afterward, the user enters the received Pin code by an input interface of the receiver 2 (step S13). The Pin code is transmitted to the receiver 2. The Pin code is sent from the Pin code generating system 5 to the receiver 2 without the user's operation.

Therefore, the receiving module 23 of the receiver 2 receives a Pin code (step S31). The Pin code is forwarded to the IC card 3.

Afterward, the decoding module 36 of the IC card 3 receives the Pin code and decodes it (step S41), and the audiovisual access criterion updating module 37 updates the audiovisual access criterion according to the update information (step S41).

In this embodiment, the audiovisual access criterion is updated by the Pin code generated at the user's request.

At least a module of the content distribution system in the aforesaid embodiments is hardware or software. If it is software, a program executable to perform at least a module of the functionality of the content distribution system can be stored in a record medium, such as a floppy disk or CD-ROM, so as to be read and executed by a computer. The record medium is not restricted to a magnetic disk or a compact disk, which is mountable and demountable, but also includes a fixed record medium, such as a hard disk drive device or memory.

Moreover, the program executable to perform at least a module of the functionality of the content distribution system can be distributed by a communication network (including a wireless network), such as the Internet. Furthermore, it is also feasible that the program is encoded, modulated, or compressed in order to be distributed by a wireless network or a wired network, such as the Internet, or stored in a record medium.

Given the above description, persons skilled in the art may think of a supplemental effect or various variations of the present invention. However, the present invention is not restricted to the aforesaid embodiments. Various supplements, changes, and partial deletions can be made to the present invention without departing from the scope and conceptual thoughts derived from technical features, and equivalents thereof, recited in the claims.

What is claimed is:

1. An audiovisual access criterion updating method, for updating an audiovisual access criterion in an audiovisual access criterion managing device, the audiovisual access criterion managing device managing the audiovisual access criterion of a content signal, the audiovisual access criterion updating method comprising:
   a step of receiving update information descriptive of update content of the audiovisual access criterion and identification information of the audiovisual access criterion managing device from a user by an updating code generating system;
   a step of generating an updating code by the updating code generating system according to the update information and the identification information;
   a step of receiving the updating code by the audiovisual access criterion managing device, the updating code being based on a manual input of the user sent with the updating code; and
   a step of updating the audiovisual access criterion by the audiovisual access criterion managing device according to the updating code,
   wherein the updating code includes a serial number indicative of a number of times the updating code has ever been generated, and the audiovisual access criterion managing device has a memory module for storing a number of times the audiovisual access criterion has ever been updated, the step of updating the audiovisual access criterion compares the serial number with the number of times the audiovisual access criterion has ever been updated and thereby determines whether to update the audiovisual access criterion.

2. The audiovisual access criterion updating method of claim 1, wherein the audiovisual access criterion managing device is a receiver for receiving the content signal, and the audiovisual access criterion managing device receives the updating code which the user manually inputs into the receiver.

3. The audiovisual access criterion updating method of claim 1, wherein the step of generating the updating code involves generating the updating code inclusive of a serial number with different values in each instance of generating the updating code.

4. The audiovisual access criterion updating method of claim 1, wherein the step of generating the updating code involves encoding the update information by a specific key possessed by the audiovisual access criterion managing device and shown by the identification information to thereby generate the updating code.

5. An updating code generating system, for generating an updating code for updating an audiovisual access criterion in an audiovisual access criterion managing device managing the audiovisual access criterion of a content signal, the updating code generating system comprising:
   a billing device for performing billing according to the update information descriptive of update content of the audiovisual access criterion and received by a user, and identification information of the audiovisual access criterion managing device; and
   an updating code generating device, which is a separate device from the billing device, for generating the updating code to be sent to the user by a specific key possessed by the audiovisual access criterion managing device using the updating code, wherein the updating code includes a serial number indicative of a number of times the updating code has ever been generated, and the audiovisual access criterion managing device has a memory module for storing a number of times the audiovisual access criterion has ever been updated, and an audiovisual access criterion updating device for comparing the serial number with the number of times the audiovisual access criterion has ever been updated and thereby determining whether to update the audiovisual access criterion.

6. An updating code generating device, for generating an updating code for updating an audiovisual access criterion in an audiovisual access criterion managing device managing the audiovisual access criterion of a content signal, the updating code generating device comprising:
a receiver for receiving update information descriptive of update content of the audiovisual access criterion from a user, and identification information of the audiovisual access criterion managing device; and
a code generator for generating the updating code to be sent to the user by encoding the update information by a specific key possessed by the audiovisual access criterion managing device and shown by the identification information,
wherein the updating code includes a serial number indicative of a number of times the updating code has ever been generated, and the audiovisual access criterion managing device has a memory module for storing a number of times the audiovisual access criterion has ever been updated, and an audiovisual access criterion updating device for comparing the serial number with the number of times the audiovisual access criterion has ever been updated and thereby determining whether to update the audiovisual access criterion.

7. The updating code generating device of claim 6, wherein the code generator generates the updating code inclusive of a serial number with different values in each instance of generating the updating code.

8. An audiovisual access criterion managing device, adapted to send a key for decoding an encoded content signal to a receiver for receiving the encoded content signal when an audiovisual access criterion is met, the audiovisual access criterion managing device comprising:
an audiovisual access criterion updating device for updating the audiovisual access criterion according to an updating code which is manually input into the receiver by a user and corresponds to identification information of the audiovisual access criterion managing device and update content of the audiovisual access criterion,
wherein the updating code includes a serial number indicative of a number of times the updating code has ever been generated, and the audiovisual access criterion managing device has a memory module for storing a number of times the audiovisual access criterion has ever been updated, the audiovisual access criterion updating device compares the serial number with the number of times the audiovisual access criterion has ever been updated and thereby determines whether to update the audiovisual access criterion.

9. The audiovisual access criterion managing device of claim 8, wherein the updating code is generated by an updating code generating system comprising:
a billing device for performing billing according to the update information descriptive of update content of the audiovisual access criterion and received by a user, and identification information of the audiovisual access criterion managing device; and an updating code generating device, which is a separate device from the billing device, for generating the updating code to be sent to the user by a specific key possessed by the audiovisual access criterion managing device using the updating code.

10. The audiovisual access criterion managing device of claim 8, wherein the updating code is generated by an updating code generating device comprising:
a receiver for receiving update information descriptive of update content of the audiovisual access criterion from a user, and identification information of the audiovisual access criterion managing device; and
a code generator for generating the updating code to be sent to the user by encoding the update information by a specific key possessed by the audiovisual access criterion managing device and shown by the identification information.

11. The audiovisual access criterion managing device of claim 8, wherein the receiver receives date information about a distribution date of the encoded content signal, and the audiovisual access criterion updating device updates an audiovisual access deadline in the audiovisual access criterion according to the date information.

12. A content receiving system, comprising:
a receiver for receiving an encoded content signal and showing date information of a distribution date of the content signal; and
the audiovisual access criterion managing device of claim 8;
wherein the audiovisual access criterion managing device sends a key for decoding the encoded content signal to the receiver when the audiovisual access criterion is met, as determined according to the date information,
wherein the receiver decodes the encoded content signal as soon as the key for decoding the content signal is sent.

13. An audiovisual access criterion managing device, comprising:
a first receiver for receiving an updating code about extending an audiovisual access time period of a content signal by a specified time period, and
an audiovisual access criterion updating device for updating an audiovisual access deadline for the content signal according to a date of receiving the content signal for a first time and the specified time period after receiving the updating code,
wherein the updating code includes a serial number indicative of a number of times the updating code has ever been generated, and the audiovisual access criterion managing device has a memory module for storing a number of times the audiovisual access criterion has ever been updated, the audiovisual access criterion updating device compares the serial number with the number of times the audiovisual access criterion has ever been updated and thereby determines whether to update the audiovisual access criterion.

14. The audiovisual access criterion managing device of claim 13, wherein the audiovisual access criterion managing device is a receiver for receiving the content signal, and the first receiver receives the updating code manually input into the receiver by the user.

15. The audiovisual access criterion managing device of claim 13, further comprising a second receiver for receiving date information about a distribution date of the content signal, wherein the audiovisual access criterion updating device defines a date of receiving the content signal for a first time after having received the updating code according to the date information.

16. A content receiving system, comprising:
a receiver for receiving an encoded content signal and showing date information of a distribution date of the content signal; and
the audiovisual access criterion managing device of claim 13;
wherein the audiovisual access criterion managing device sends a key for decoding the encoded content signal to the receiver when the audiovisual access criterion is met, as determined according to the date information,
wherein the receiver decodes the encoded content signal as soon as the key for decoding the content signal is sent.

17. A content distribution system, comprising: a broadcast device; a receiver; an IC card inserted into the receiver; a play device not having a tuner for processing a broadcast wave from the broadcast device; and an updating code generating system, wherein the broadcast device comprises:
a first encoder for encoding, by a first key, a content signal to generate an encoded content signal;
a second encoder for encoding, by a second key, the first key and date information descriptive of a distribution date of the content signal to generate first control information; and
a third encoder for encoding, by a third key in the IC card, the second key to generate second control information,
wherein the encoded content signal, the first control information and the second control information are transmitted to the receiver by the broadcast wave,
wherein the receiver comprises:
a tuner for processing the encoded content signal, the first control information and the second control information;
a first decoder for decoding the encoded content signal when the IC card sends the first key and thereby restoring the content signal; and
a first receiver for receiving an updating code manually input by a user, wherein the updating code is generated by encoding, with the third key, update content of an audiovisual access criterion and a serial number showing a number of times the updating code has ever been generated;
wherein the restored content signal is played by the play device,
the IC card comprises:
a second decoder for receiving the second control information through the receiver, decoding the second control information by the third key of the IC card, and thereby restoring the second key;
a third decoder for receiving the first control information through the receiver, decoding the first control information by the restored second key, and thereby restoring the first key and the date information;
an audiovisual access criterion setting device for setting an audiovisual access deadline of the content signal to a last day of a predetermined audiovisual access time period from a date indicated by the date information when the encoded content signal is received for a first time;
a deadline determining device for determining whether to send the first key by comparing the date indicated by the date information with the audiovisual access deadline when the encoded content signal is received;
an output device for sending the first key to the receiver when the determination is affirmative;
a fourth decoder for receiving the encoded updating code through the receiver and decoding the encoded updating code by the third key of the IC card;
a memory module for storing data about a number of times the audiovisual access criterion has ever been updated; and
an audiovisual access criterion updating device for updating the audiovisual access criterion according to the updating code and the date information when the number of times the audiovisual access criterion has ever been updated equals the serial number included in the updating code;
wherein the updating code generating system comprises:
a billing device for performing billing as soon as the updating code is generated; and
an updating code generating device for generating the updating code;
wherein the billing device comprises:
a second receiver for receiving update information descriptive of update content for the audiovisual access criterion and the IC card identification information from the user; and
a billing performing device for performing billing according to the update content;
the updating code generating device comprises:
a third receiving receiver for receiving the update information and the identification information; and
a code generator for generating the updating code to be sent to the user by encoding the update information and the serial number with the third key possessed by the IC card and shown by the identification information.

* * * * *